(12) United States Patent
Zhu et al.

(10) Patent No.: US 11,812,011 B2
(45) Date of Patent: Nov. 7, 2023

(54) METHOD AND SYSTEM FOR EVALUATING VIEWPOINT DENSITY, PROCESSING DEVICE, AND COMPUTER STORAGE MEDIUM

(71) Applicant: BOE Technology Group Co., Ltd., Beijing (CN)

(72) Inventors: Jinye Zhu, Beijing (CN); Jian Gao, Beijing (CN); Junxing Yang, Beijing (CN); Tao Hong, Beijing (CN); Jing Liu, Beijing (CN); Jing Yu, Beijing (CN); Tianyang Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/765,453

(22) PCT Filed: May 12, 2021

(86) PCT No.: PCT/CN2021/093426
§ 371 (c)(1),
(2) Date: Mar. 31, 2022

(87) PCT Pub. No.: WO2022/147936
PCT Pub. Date: Jul. 14, 2022

(65) Prior Publication Data
US 2023/0188700 A1    Jun. 15, 2023

(30) Foreign Application Priority Data
Jan. 5, 2021    (CN) .......................... 202110006814.6

(51) Int. Cl.
H04N 13/302    (2018.01)
H04N 13/354    (2018.01)
(Continued)

(52) U.S. Cl.
CPC ............. *H04N 13/302* (2018.05); *G06F 3/14* (2013.01); *G06T 7/62* (2017.01); *G06V 10/60* (2022.01);
(Continued)

(58) Field of Classification Search
CPC combination set(s) only.
See application file for complete search history.

(56) References Cited

U.S. PATENT DOCUMENTS

2007/0225096 A1    9/2007  Fujita
2014/0292732 A1   10/2014  Niioka et al.
2019/0369407 A1*  12/2019  Kim ....................... G02B 30/27

FOREIGN PATENT DOCUMENTS

CN    102497563 A    6/2012
CN    103698929 A    4/2014
(Continued)

OTHER PUBLICATIONS

International Search Report for PCT/CN2021/093426 dated Sep. 26, 2021.
(Continued)

*Primary Examiner* — Behrooz M Senfi
(74) *Attorney, Agent, or Firm* — Ling Wu; Stephen Yang; Ling and Yang Intellectual Property

(57) ABSTRACT

A method, a system, a processing device and a computer storage medium for evaluating a viewpoint density are provided. The method includes: acquiring a quantity of viewpoints of a display panel; comparing a size of an image spot radius of each viewpoint and image point spacing between the viewpoint and an adjacent viewpoint, and selecting one viewpoint as a reference viewpoint, calculating a crosstalk value between another viewpoint except the reference viewpoint and the reference viewpoint; and evaluating a viewpoint density for the auto-stereoscopic display (Continued)

according to the comparison of the size of the image spot radius of each viewpoint and the image point spacing between the viewpoint and the adjacent viewpoint and the calculated crosstalk value between the another viewpoint and the reference viewpoint.

14 Claims, 11 Drawing Sheets

(51) Int. Cl.
    *G06T 7/62*         (2017.01)
    *G09G 3/32*         (2016.01)
    *G06V 10/74*       (2022.01)
    *G06F 3/14*         (2006.01)
    *G06V 10/60*       (2022.01)

(52) U.S. Cl.
    CPC ............. *G06V 10/761* (2022.01); *G09G 3/32* (2013.01); *H04N 13/354* (2018.05)

(56) References Cited

FOREIGN PATENT DOCUMENTS

| | | | |
|---|---|---|---|
| CN | 105915894 A | 8/2016 | |
| CN | 106254851 A | 12/2016 | |
| JP | 2007-248999 A | 9/2007 | |
| WO | WO-2022095017 A1 * | 5/2022 | ....... G02F 1/133526 |

OTHER PUBLICATIONS

"3D Global GmbH", May 22, 2019.
Search Report for European Application No. 21916986.9 dated Sep. 4, 2023.
Polytec, "Autostereoscopic 3D Display Characterization", Nov. 30, 2008.
Atanas Boev et al., "Crosstalk Measurement Methodology for Auto-Stereoscopic Screens", 3DTV Conference, May 1, 2007.

* cited by examiner

| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |
|---|---|---|---|---|---|---|---|---|---|---|---|---|---|---|---|---|---|---|---|---|---|---|---|---|---|
| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |
| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |
| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |
| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |
| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |
| 28 | 27 | 26 | 25 | ... | 8 | 7 | 6 | 5 | 4 | 3 | 2 | 1 | 28 | 27 | 26 | 25 | ... | 8 | 7 | 6 | 5 | 4 | 3 | 2 | 1 |

FIG. 3

METHOD AND SYSTEM FOR EVALUATING VIEWPOINT DENSITY, PROCESSING DEVICE, AND COMPUTER STORAGE MEDIUM

CROSS-REFERENCE TO RELATED APPLICATIONS

The present application is a U.S. National Phase Entry of International Application PCT/CN2021/093426 having an international filing date of May 12, 2021, which claims priority of Chinese Patent Application No. 202110006814.6, entitled "Method and System for Evaluating Viewpoint Density, Processing Device, and Computer Storage Medium", filed to the CNIPA on Jan. 5, 2021, the contents disclosed in the above-mentioned applications are hereby incorporated as a part of this application.

TECHNICAL FIELD

Embodiments of the present disclosure relate to, but are not limited to, the technical field of intelligent display, and in particular, to a method and a system for evaluating a viewpoint density, a processing device, and a computer storage medium.

BACKGROUND TECHNOLOGY

An auto-stereoscopic (or glass-free 3D) display device is a display device by which a 3D display picture can be seen without need of wearing an auxiliary tool. A display principle of the auto-stereoscopic display device is that: a lens cylindrical surface or a parallax grating is placed in front of a display panel of the display device, so that the display picture seen by a left eye is different from that seen by a right eye, so as to make the display picture produce a 3D visual effect.

At present, super multi viewpoint technology is usually used for auto-stereoscopic displaying. However, how to choose an appropriate quantity of viewpoints or how to evaluate advantages and disadvantages of the quantity of viewpoints of a current display screen, has become a problem to be solved in fields of auto-stereoscopic technology and 3D display device manufacturing.

SUMMARY

The following is a summary of subject matters described herein in detail. This summary is not intended to limit the scope of protection of claims.

An embodiment of the present disclosure provides a method for evaluating a viewpoint density, including: acquiring a quantity of viewpoints of a display panel; comparing sizes of an image spot radius of each viewpoint and image point spacing between the viewpoint and an adjacent viewpoint, and selecting one viewpoint as a reference viewpoint, calculating a crosstalk value between another viewpoint except the reference viewpoint and the reference viewpoint; and evaluating a viewpoint density for the auto-stereoscopic display according to the comparison of the sizes of the image spot radius of each viewpoint and the image point spacing between the viewpoint and the adjacent viewpoint and the calculated crosstalk value between the another viewpoint and the reference viewpoint.

In an exemplary embodiment, a light-emitting side of the display panel includes multiple grating arrays arranged along a set direction; the image spot radius of each viewpoint is calculated according to a following formula:

image spot radius=(pupil diameter/(quantity of viewpoints*2*distance from human eye to grating array)+ 1.22*wavelength/length of each grating unit in the grating array)*image distance; and the image point spacing between the viewpoint and the adjacent viewpoint is calculated according to a following formula:

the length of each grating unit in the grating array*distance from the human eye to image point/the distance from the human eye to the grating array.

In an exemplary embodiment, before selecting one viewpoint as a reference viewpoint, the method further includes: controlling the display panel to display an image of each viewpoint sequentially, wherein when the image of each viewpoint is displayed, all sub-pixels used for displaying the image of the current viewpoint display white images, and all sub-pixels used for displaying the images of other viewpoints display black images, and sequentially acquiring a brightness value of light at each test angle corresponding to when displaying the image of the current viewpoint on a light-emitting side of the display panel, obtaining a white light brightness curve of all the viewpoints.

In an exemplary embodiment, the selecting one viewpoint as a reference viewpoint includes: in the white light brightness curve of all the viewpoints, selecting the viewpoint with an optimal view angle equal to 0°, or greater than 0° and closest to 0° within a main lobe view angle as the reference viewpoint.

In an exemplary embodiment, the calculating a crosstalk value between another viewpoint except the reference viewpoint and the reference viewpoint includes: determining brightness values corresponding to the reference viewpoint and the another viewpoint at a peak of the reference viewpoint within a main lobe view angle of the white light brightness curve of all the viewpoints, and determining a distance between a peak of the another viewpoint and the peak of the reference viewpoint; and calculating the crosstalk value between the another viewpoint and the reference viewpoint according to the determined brightness values corresponding to the reference viewpoint and the another viewpoint at the peak of the reference viewpoint and the distance between the peak of the another viewpoint and the peak of the reference viewpoint.

In an exemplary embodiment, the crosstalk value between the another viewpoint and the reference viewpoint is directly proportional to the brightness value corresponding to the another viewpoint at the peak of the reference viewpoint, is inversely proportional to the brightness value corresponding to the reference viewpoint at the peak of the reference viewpoint, and is inversely proportional to the distance between the peak of the another viewpoint and the peak of the reference viewpoint.

In an exemplary embodiment, within the main lobe view angle of the white light brightness curve of all the viewpoints, the brightness value corresponding to the reference viewpoint at the peak of the reference viewpoint is $L_i$, a brightness value corresponding to a viewpoint j at the peak of the reference viewpoint is $L_j$, both i and j are between 1 and N, and i $\neq$ j, N is the quantity of viewpoints of the display panel, and a distance between a peak of the viewpoint j and the peak of the reference viewpoint is $D_{ij}$; and a crosstalk value between the viewpoint j and the reference viewpoint is: $L_j/(L_i*D_{ij})$.

In an exemplary embodiment, the another viewpoint includes a viewpoint located on the left side of the reference viewpoint and a viewpoint located on the right side of the reference viewpoint.

In an exemplary embodiment, the method further includes: acquiring a crosstalk weight value of the another viewpoint except the reference viewpoint; and calculating a total crosstalk value according to the crosstalk value between the another viewpoint and the reference viewpoint and the crosstalk weight value.

In an exemplary embodiment, evaluating the viewpoint density for the auto-stereoscopic display according to the comparison of the sizes of the image spot radius of each viewpoint and the image point spacing between the viewpoint and the adjacent viewpoint and the calculated crosstalk value between the another viewpoint and the reference viewpoint includes: when the image spot radius of each viewpoint is less than or equal to the image point spacing between the viewpoint and the adjacent viewpoint, and the calculated total crosstalk value is less than a preset total crosstalk threshold, evaluating the viewpoint density for the auto-stereoscopic display to be excellent; and when the image spot radii of one or more viewpoints in the image spot radii of each of the viewpoints are larger than the image point spacing between the viewpoint and the adjacent viewpoint, or the calculated total crosstalk value is greater than a preset total crosstalk threshold, evaluating the viewpoint density for the auto-stereoscopic display to be poor.

In an exemplary embodiment, the evaluating the viewpoint density for the auto-stereoscopic display according to the comparison of the sizes of the image spot radius of each viewpoint and the image point spacing between the viewpoint and the adjacent viewpoint and the calculated crosstalk value between the another viewpoint and the reference viewpoint includes: when the image spot radius of each viewpoint is less than or equal to the image point spacing between the viewpoint and the adjacent viewpoint, and the calculated crosstalk value between each of the another viewpoint and the reference viewpoint is less than a preset crosstalk threshold, evaluating the viewpoint density for the auto-stereoscopic display to be excellent; and when the image spot radii of one or more viewpoints in the image spot radius of each viewpoint are larger than the image point spacing between the viewpoint and the adjacent viewpoint, or one or more of the calculated crosstalk values between other viewpoints and the reference viewpoint are larger than a preset crosstalk threshold, evaluating the viewpoint density for the auto-stereoscopic display to be poor.

An embodiment of the present disclosure further provides a processing device, including: a processor and a memory storing a computer program that is runnable on the processor, wherein when the processor executes the program, steps of the method for evaluating a viewpoint density as previously described is implemented.

An embodiment of the present disclosure also provides a system for evaluating a viewpoint density, which includes a display module, an optical test device, and a processing device as previously described, wherein: the display module includes a display panel and a grating array arranged on a light-emitting side of the display panel; the optical test device is configured to measure a brightness value of light on the light-emitting side of the display panel.

An embodiment of the present disclosure also provides a computer readable storage medium, storing executable instructions, wherein steps of the method for evaluating a viewpoint density as described in any one of the above can be implemented when the executable instructions are executed by a processor.

After the accompanying drawings and detailed descriptions are read and understood, other aspects may be understood.

BRIEF DESCRIPTION OF DRAWINGS

Accompany drawings are used to provide understanding of technical solutions of the present disclosure, and form a part of the description. They are used to explain the technical solutions of the present disclosure together with embodiments of the present disclosure, and do not form a limitation on the technical solutions of the present disclosure.

FIG. 3 is a schematic diagram of arrangement of sub-pixels on a display panel according to an embodiment of the present disclosure.

DETAILED DESCRIPTION

Specific implementation modes of the present disclosure will be described further in detail below with reference to accompanying drawings and embodiments. Following embodiments serve to illustrate the present disclosure, but are not intended to limit the scope of the present disclosure.

It is to be noted that the embodiments in the present disclosure and features in the embodiments may be randomly combined with each other if there is no conflict.

Figure 1:
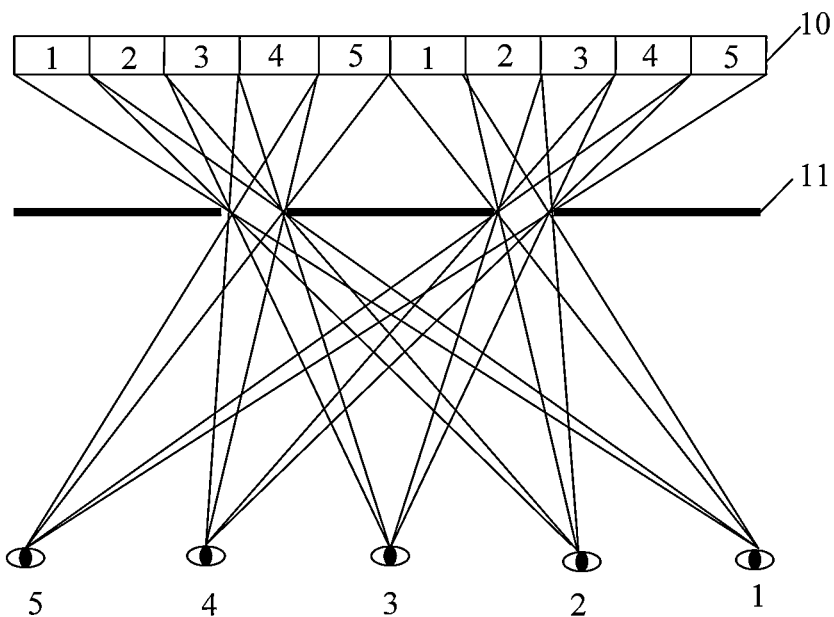
FIG. 1 is a schematic flow diagram of a display principle schematic diagram of an auto-stereoscopic display device.

At present, ultra-multi-viewpoint technology is usually used for auto-stereoscopic displaying, that is, multiple viewpoints are set to enable a user may see 3D display pictures at multiple positions. As shown in FIG. 1, the display panel 10 is provided with a total of five viewpoints including a viewpoint 1, a viewpoint 2, a viewpoint 3, a viewpoint 4 and a viewpoint 5. At this time, a grating 11 located in front of the display panel 10 may enable a user's eyes at a certain position to see display pictures corresponding to two adjacent viewpoints among the five viewpoints. For example, the left eye of the user may see a display picture corresponding to the viewpoint 3, and the right eye of the user may see a display picture corresponding to the viewpoint 2. At this time, the user may see a 3D display picture.

With improvement of screen resolution, a quantity of viewpoints in 3D display is increasing. The more viewpoints, and the denser the viewpoints, the smoother the viewing is. Otherwise, there will be jumping changes. However, when the quantity of viewpoints is too large, the image points of images of adjacent viewpoints are blurred, and the more the viewpoints, the more crosstalk introduced. Therefore, how to choose an appropriate quantity of the viewpoints, or how to evaluate advantages and disadvantages of the quantity of viewpoints of a current 3D display device, has become a problem to be solved in the field of auto-stereoscopic technology and manufacturing of auto-stereoscopic display devices.

Embodiments of the present disclosure provide a method and a system for evaluating a viewpoint density, a processing device, and a computer storage medium, a viewpoint density for the auto-stereoscopic display is evaluated according to comparison of a size of an image spot radius of each viewpoint and image point spacing between the viewpoint and an adjacent viewpoint and a calculated crosstalk value between another viewpoint and a reference viewpoint, so that it may be achieved that an appropriate quantity of viewpoints is selected in design of an auto-stereoscopic display device, or it may be used to evaluate the advantages and the disadvantages of the quantity of viewpoints of the current auto-stereoscopic display device, so as to achieve an optimal design of the quantity of viewpoints of the auto-stereoscopic display device and improve auto-stereoscopic display effects.

Figure 2:
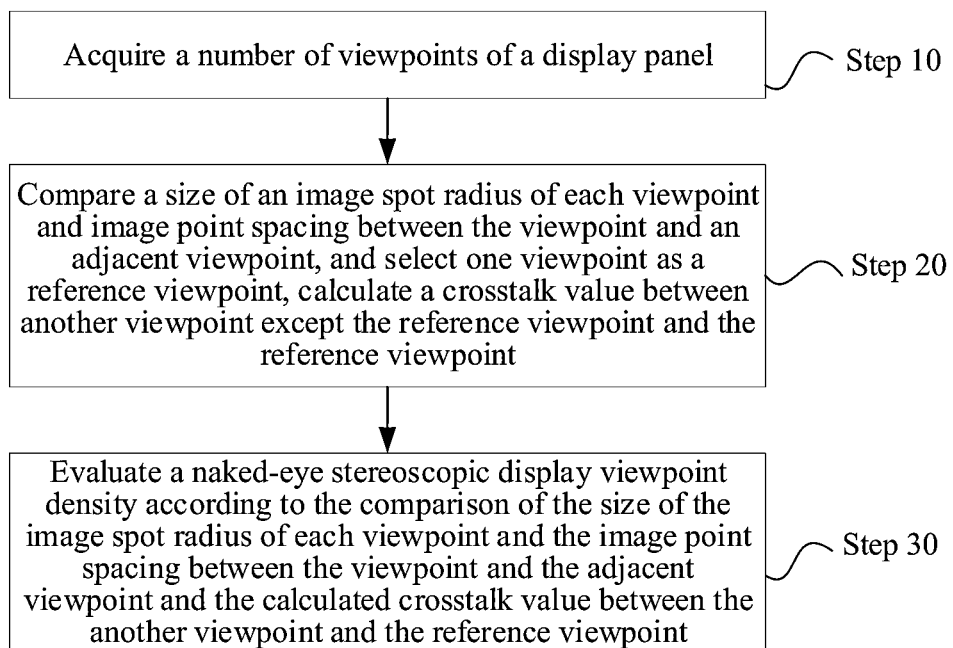
FIG. 2 is a schematic flow diagram of a method for evaluating a viewpoint density according to an embodiment of the present disclosure.

As shown in FIG. 2, an embodiment of the present disclosure provides a method for evaluating a viewpoint density, including steps 10 to 30.

In the step 10, a quantity of viewpoints of a display panel is acquired.

In an exemplary embodiment, the display panel includes multiple sub-pixels distributed in a matrix. Taking an auto-stereoscopic display panel with a 65-inch 8K high-definition display resolution as an example, a 28-viewpoint image display module, a 27-viewpoint image display module and a 16-viewpoint image display module are respectively designed, and the viewpoint density evaluation is performed by the method for evaluating the viewpoint density according to the embodiment of the present disclosure.

Taking the 28-viewpoint image display module as an example, as shown in FIG. 3, the display panel includes 28 groups of sub-pixels, a first group of sub-pixels 1, a second group of sub-pixels 2, a third group of sub-pixels 3, . . . , to a $28^{th}$ group of sub-pixels 28 correspondingly used for displaying 28 images of viewpoints respectively. In the present embodiment, an arrangement mode of the sub-pixels is not limited to the arrangement mode shown in FIG. 3.

In the step 20, a size of an image spot radius of each viewpoint and image point spacing between the viewpoint and an adjacent viewpoint are compared, and one viewpoint is selected as a reference viewpoint, and a crosstalk value between another viewpoint except the reference viewpoint and the reference viewpoint is calculated.

In an exemplary embodiment, when comparing the size of the image spot radius of each viewpoint and the image point spacing between the viewpoint and the adjacent viewpoint, from a viewpoint 1 to a viewpoint N, the size of the image spot radius of each viewpoint and the image point spacing between the viewpoint and the adjacent viewpoint are compared one by one. For example, for the viewpoint 1, a size of an image spot radius of the viewpoint 1 and image point spacing between the viewpoints 1 and 2 are compared. For the viewpoint 2, a size of an image spot radius of the viewpoint 2 and image point spacing between the viewpoints 1 and 2 are compared, and the size of the image spot radius of the viewpoint 2 and image point spacing between the viewpoints 2 and 3 are compared. For the viewpoint 3, a size of an image spot radius of viewpoint 3 and the image point spacing between the viewpoints 2 and 3 are compared, and the size of the image spot radius of the viewpoint 3 and image point spacing between the viewpoints 3 and 4 are compared; . . . ; for the viewpoint (N-1), a size of an image spot radius of the viewpoint (N-1) and image point spacing between the viewpoints (N-2) and (N-1) are compared, and the size of the image spot radius of the viewpoint (N-1) and the image point spacing between the viewpoints (N-1) and N are compared. For the viewpoint N, the size of the image spot radius of the viewpoint N and image point spacing between the viewpoints (N-1) and N are compared, wherein N is the quantity of viewpoints.

In an exemplary embodiment, a light-emitting side of the display panel includes multiple grating arrays arranged in a set direction, wherein the image spot radius of each viewpoint is calculated according to following formula:

image spot radius=(pupil diameter/(quantity of viewpoints*2*distance from human eye to grating array)+ 1.22*wavelength/length of each grating unit in the grating array)*image distance; and the image point spacing between the viewpoint and the adjacent viewpoint is calculated according to a following formula:

the length of each grating unit in the grating array*distance from the human eye to an image point/the distance from the human eye to the grating array.

In an exemplary embodiment, the grating array may be a grating structure such as a cylindrical lens grating array or a parallax barrier grating array, etc.

When the image spot radius of one viewpoint is less than or equal to the image point spacing between the viewpoint and the adjacent viewpoint, an image spot of the viewpoint is clear. On the contrary, when the image spot radius of one viewpoint is greater than the image point spacing between the viewpoint and the adjacent viewpoint, the image spot of the viewpoint is not clear.

When the image spot radius of each viewpoint is less than or equal to the image point spacing between the viewpoint and the adjacent viewpoint, image spots of all viewpoints are clear; and when one or more of the image spot radii of each of the viewpoints are larger than image point spacing between the viewpoint and adjacent viewpoint, then the image spot of the one or more viewpoints is not clear.

Because of parallax, image points seen by human eyes may be presented in front of or behind a screen. Therefore, a distance from a human eye to an image point may be less than or equal to a distance from the human eye to the screen, or may be greater than the distance from the human eye to the screen.

In an exemplary embodiment, position data of the image point seen by the human eye is directly obtained by a processor or a control system while outputting a 3D view.

In an exemplary embodiment, before one viewpoint is selected as a reference viewpoint, the method further includes:

the display panel is controlled to display an image of each viewpoint sequentially, wherein when the image of each viewpoint is displayed, all sub-pixels used for displaying the image of the current viewpoint display white images, and all sub-pixels used for displaying images of other viewpoints display black images, a brightness value of light at each test angle corresponding to a moment of displaying the image of the current viewpoint is sequentially acquired on a light-emitting side of the display panel, thus a white light brightness curve of all the viewpoints is obtained.

In an exemplary embodiment, the image of each viewpoint corresponds to a part of the sub-pixels on the display panel, and images of all the viewpoints correspond to all the sub-pixels on the display panel. When the display panel is controlled to display the image of a certain viewpoint, all the sub-pixels corresponding to the image of the current viewpoint display white images, and all the other sub-pixels display black images.

Figure 4:
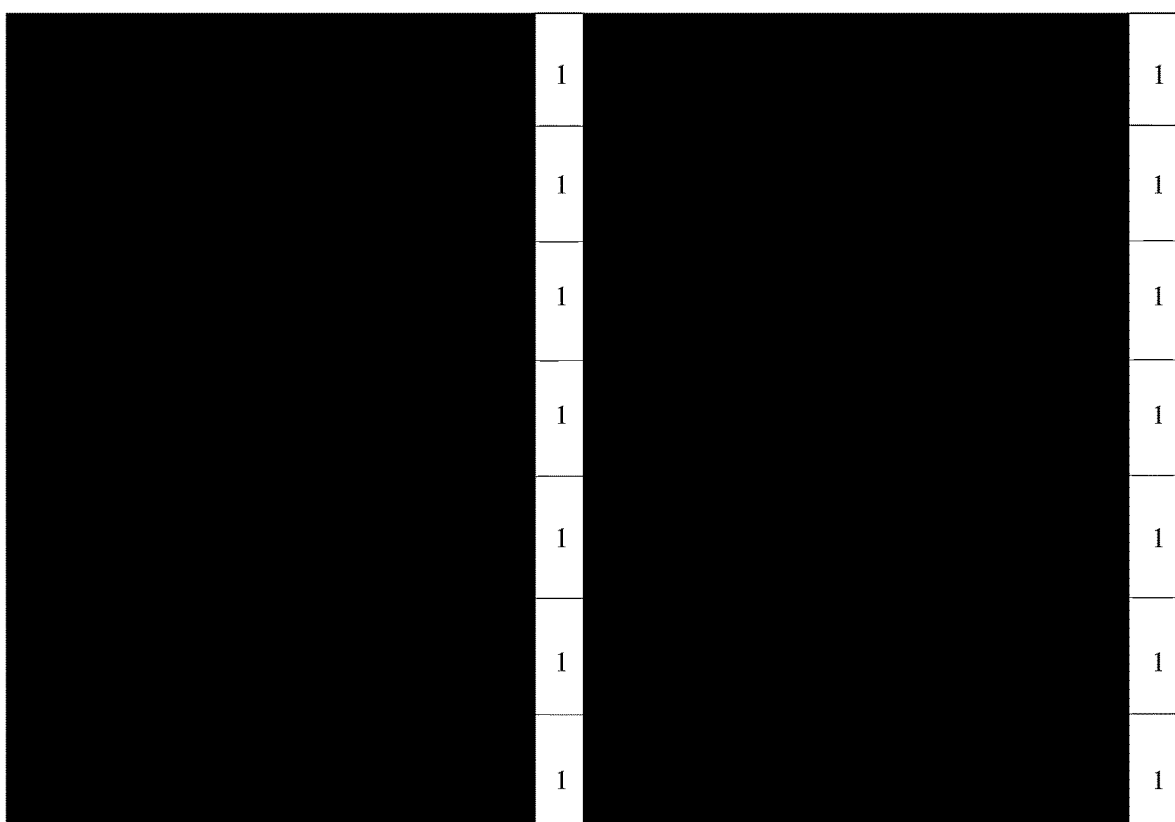
FIG. 4 is a schematic diagram of arrangement of a first group of sub-pixels corresponding to a moment of displaying an image of a first viewpoint.

The display panel is controlled to display the image of each viewpoint respectively, wherein when the image of a certain viewpoint is displayed, all the sub-pixels corresponding to the image of the viewpoint display white images, and all the sub-pixels corresponding to other viewpoint images display black images. For example: referring to FIG. 4, when an image of a first viewpoint is displayed, a first group of sub-pixels 1 of the display panel is controlled to display white images and the other sub-pixels display black images;

similarly, when an image of a second viewpoint is displayed, a second group of sub-pixels 2 of the display panel is controlled to display white images and the other sub-pixels display black images;

when an image of a third viewpoint is displayed, a third group of sub-pixels 3 of the display panel is controlled to display white images and the other sub-pixels display black images;

when an image of a fourth viewpoint is displayed, a fourth group of sub-pixels 4 of the display panel is controlled to display white images and the other sub-pixels display black images; and when an image of a $28^{th}$ viewpoint is displayed, a $28^{th}$ group of sub-pixels 28 of the display panel is controlled to display white images and the other sub-pixels display black images.

In an actual implementation process, for the image of each viewpoint, an optical test device is used to sequentially measure the brightness values of light at different test angles $\alpha1, \alpha2, \ldots, \alpha m$ on the light-emitting side of the display panel. For example, the optical test device may be a brightness meter, by which the brightness values of light at different test angles are acquired. An interval step length may be set to test the brightness values of light at multiple test angles, such as the brightness value of light is tested once for each interval of 0.5 radian angle.

In an exemplary embodiment, in order to improve accuracy of evaluating the advantages and the disadvantages of the viewpoint density for the auto-stereoscopic display, the brightness meter is moved in a same plane to measure the brightness values of light at different test angles on the same plane.

In an exemplary embodiment, since left and right eyes of human are located on a same horizontal line, the brightness meter is located on the same plane to acquire brightness values of light in different test angle directions relative to the stationary display panel, which can improve accuracy of evaluating the advantages and the disadvantages of the viewpoint density for the auto-stereoscopic display. In an actual implementation process, the brightness meter may be placed at a position on the light-emitting side of the display panel with a constant value of distance from the ground, and the brightness meter may move on a same horizontal plane to test the brightness values of each image of the viewpoint at multiple test angles.

In an exemplary embodiment, in order to further improve the accuracy of evaluating the advantages and the disadvantages of the viewpoint density for the auto-stereoscopic display, the brightness meter is located at multiple test angles on an arc on a same horizontal plane centered on a center of the display panel on the light-emitting side of the display panel, with a set distance for viewing the image as a radius, so as to test the brightness values of the image of each viewpoint at multiple test angles.

Theoretically, due to a certain loss of the light in a process of propagation, the brightness values of light at different positions in a same test angle direction will have a certain deviation. The more distant from a light source, the smaller the brightness value of the light, and the closer to the light source, the greater the brightness value of the light. In the present disclosure, the brightness meter measures the brightness value of the light at a position equidistant from a center of the display panel in different test angle directions, which can improve the accuracy of evaluating the advantages and the disadvantages of the viewpoint density for the auto-stereoscopic display.

Figure 5:
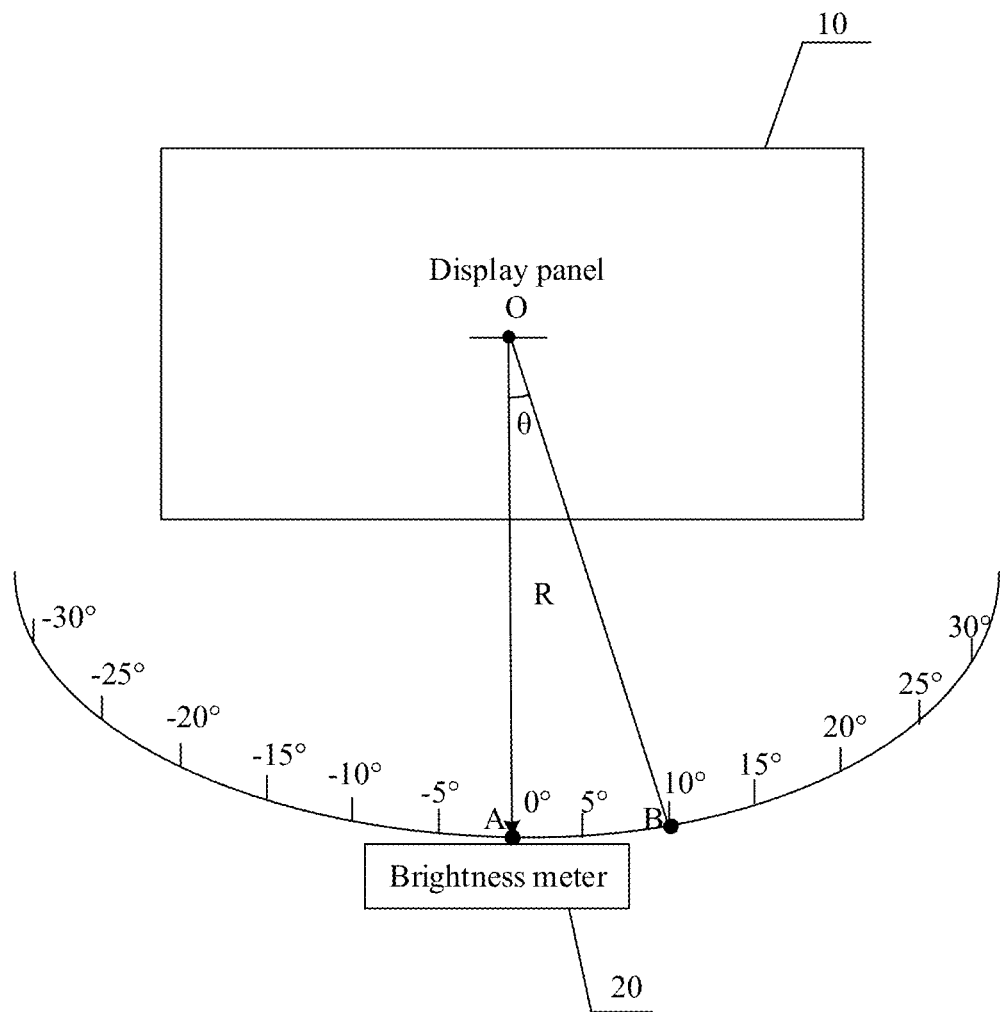
FIG. 5 is a schematic diagram of a relative position between a brightness meter and a display panel during measurement of a brightness value.

Different test angles are corresponding to different positions on the arc, in order to further improve the accuracy of evaluating the advantages and the disadvantages of the viewpoint density for the auto-stereoscopic display, the brightness values of the light may be measured at a same angle interval. For example, as shown in FIG. 5, taking a measurement position 0° corresponding to the center of the display panel as a baseline, within a stereoscopic view angle range, the brightness meter is moved counterclockwise to measure the brightness values of emergent light at positions corresponding to radian angles of 5°, 10°, 15°, 20°, and so on, respectively, and then taking the measurement position 0° corresponding to the center of the display panel as a baseline, the brightness meter is moved clockwise to measure the brightness values of emergent light at positions corresponding to radian angles of −5°, −10°, −15°, −20°, and so on, respectively. Measuring a brightness value once at an interval of 5° is only schematic, and in an actual implementation process, the brightness values may be measured once at an interval of a smaller radian value, for example, the measurement of the brightness values is performed with a step length of 0.5 or 1 degree. The acquired brightness values of different test angles are stored in the brightness meter.

As shown in FIG. 5, when measuring the brightness values, a relative position between the brightness meter 20 and the display panel 10 is: the brightness meter 20 is moved at different positions on an arc with the center (or also known as the middle) O of the display panel 10 as a center of a circle and an optimal viewing distance R of the viewer viewing the image as a radius to measure the brightness of the light. For example, one brightness value may be sequentially tested at an interval of 0.5° radian angle within the range of 30° to −30°, and 121 brightness values are sequentially tested at 121 test angles for the image of each viewpoint.

According to the brightness values Yji (j=1, 2, 3, . . . , 28; i=1, 2, 3, . . . , 121) acquired in the above steps and a corresponding relationship between each brightness value Yji and the test angle, a white light brightness distribution curve with brightness varying with the test angle is generated.

For example, white light brightness distribution curves of the image of the first viewpoint at different test angles are generated according to the corresponding relationship between the brightness value Y1i corresponding to the image of the first viewpoint acquired by the brightness meter and the test angles $\alpha 1, \alpha 2, \alpha 3, \ldots, \alpha 121$, wherein Y1i is a brightness value of light at the i-th test angle tested when displaying the image of the first viewpoint;

white light brightness distribution curves of the image of the second viewpoint at different test angles are generated according to the corresponding relationship between the brightness value Y2i corresponding to the image of the second viewpoint acquired by the brightness meter and the test angles $\alpha 1, \alpha 2, \alpha 3, \ldots, \alpha 121$, wherein Y2i is a brightness value of light at the i-th test angle tested when displaying the image of the second viewpoint;

white light brightness distribution curves of the image of the third viewpoint at different test angles are generated according to the corresponding relationship between the brightness value Y3i corresponding to the image of the third viewpoint acquired by the brightness meter and the test angles $\alpha 1, \alpha 2, \alpha 3, \ldots, \alpha 121$, wherein Y3i is a brightness value of light at the i-th test angle tested when displaying the image of the third viewpoint;

white light brightness distribution curves of the image of the $28^{th}$ viewpoint at different test angles are generated according to the corresponding relationship between the brightness value Y28i corresponding to the image of the $28^{th}$ viewpoint acquired by the brightness meter and the test angles $\alpha 1, \alpha 2, \alpha 3, \ldots, \alpha 121$, wherein Y28i is a brightness value of light at the i-th test angle tested when displaying the image of the $28^{th}$ viewpoint.

In an exemplary embodiment, in order to acquire a brightness peak in brightness values corresponding to each viewing area more conveniently, brightness distribution graphs of brightness values corresponding to the image of each viewpoint with test angles are respectively acquired. A brightness distribution graph corresponding to the image of each viewpoint is superimposed (that is, the brightness distribution graph corresponding to the image of each viewpoint is placed in a same rectangular coordinate system), multiple brightness values corresponding to the image of each viewpoint are acquired in the superimposed brightness distribution curve, multiple brightness peaks exist in the brightness values, and each brightness peak corresponds to one viewing area at the light-emitting side of the display panel.

Figure 6:
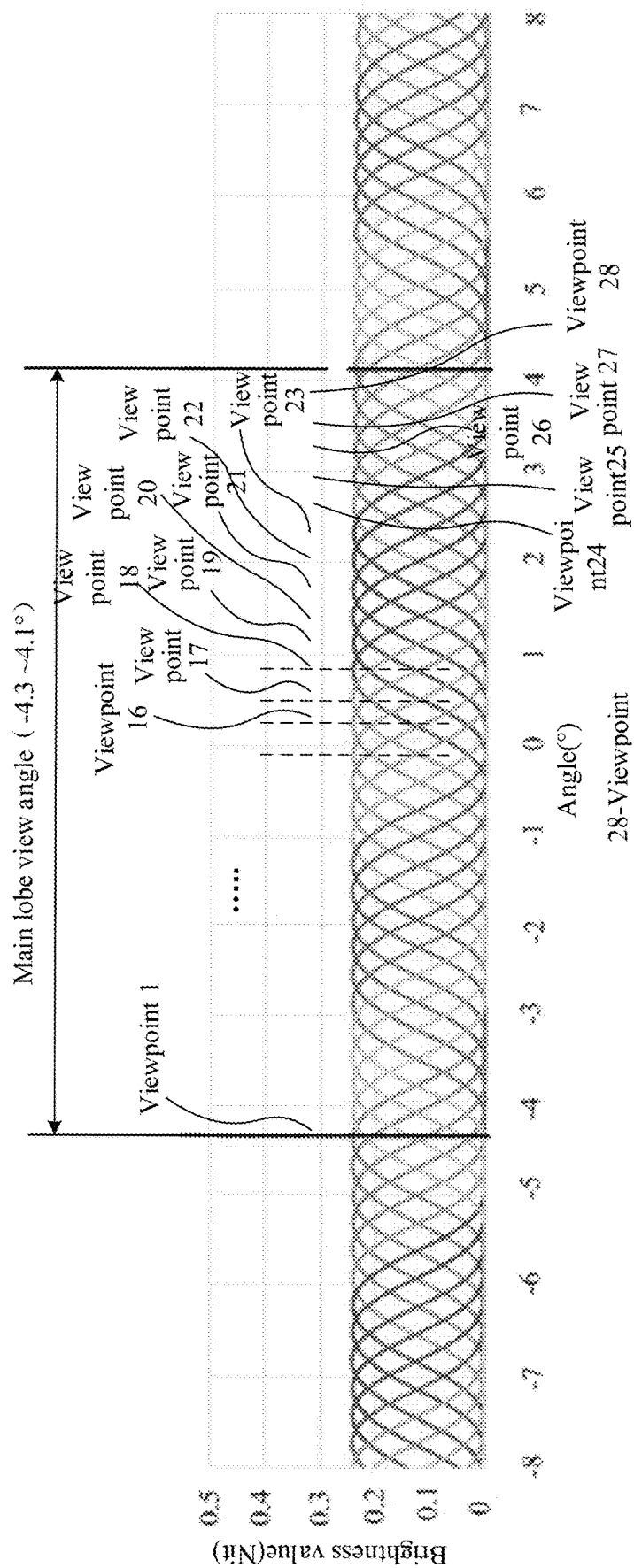
FIG. 6 is a superimposed diagram of a brightness distribution curve corresponding to an image of each viewpoint of a 28-viewpoint image display module.
Figure 7:
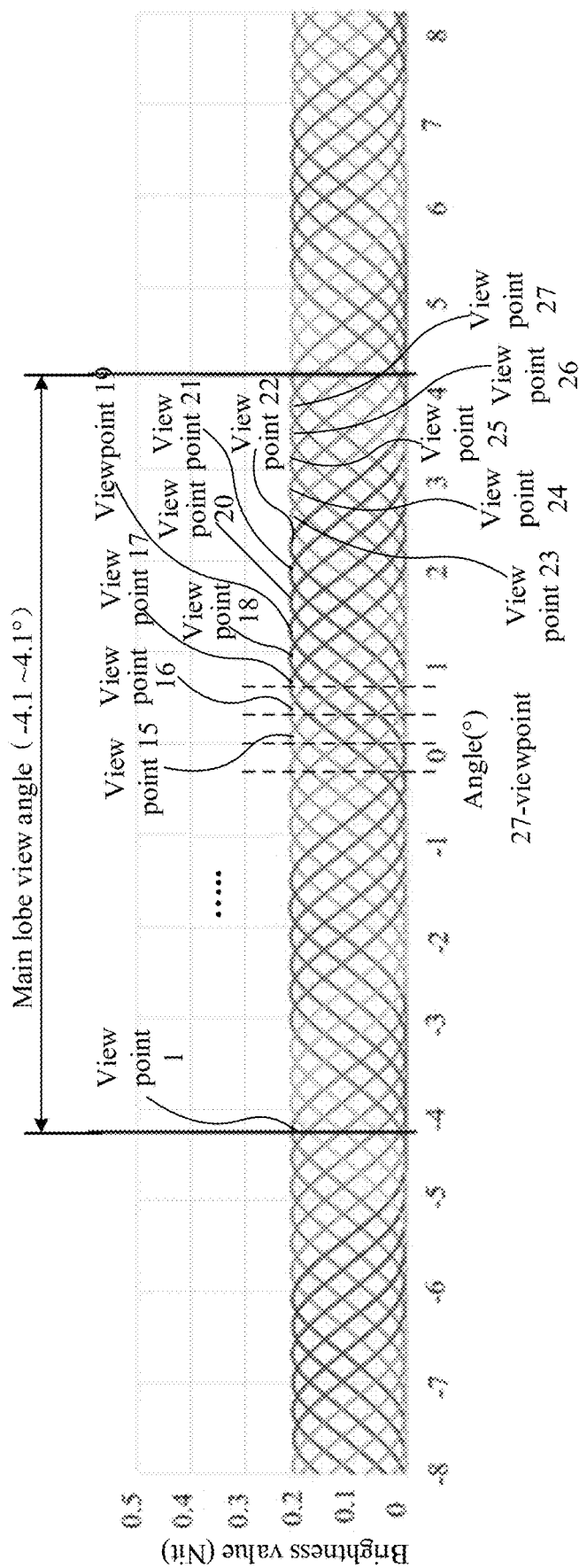
FIG. 7 is a superimposed diagram of a brightness distribution curve corresponding to an image of each viewpoint of a 27-viewpoint image display module.
Figure 8:
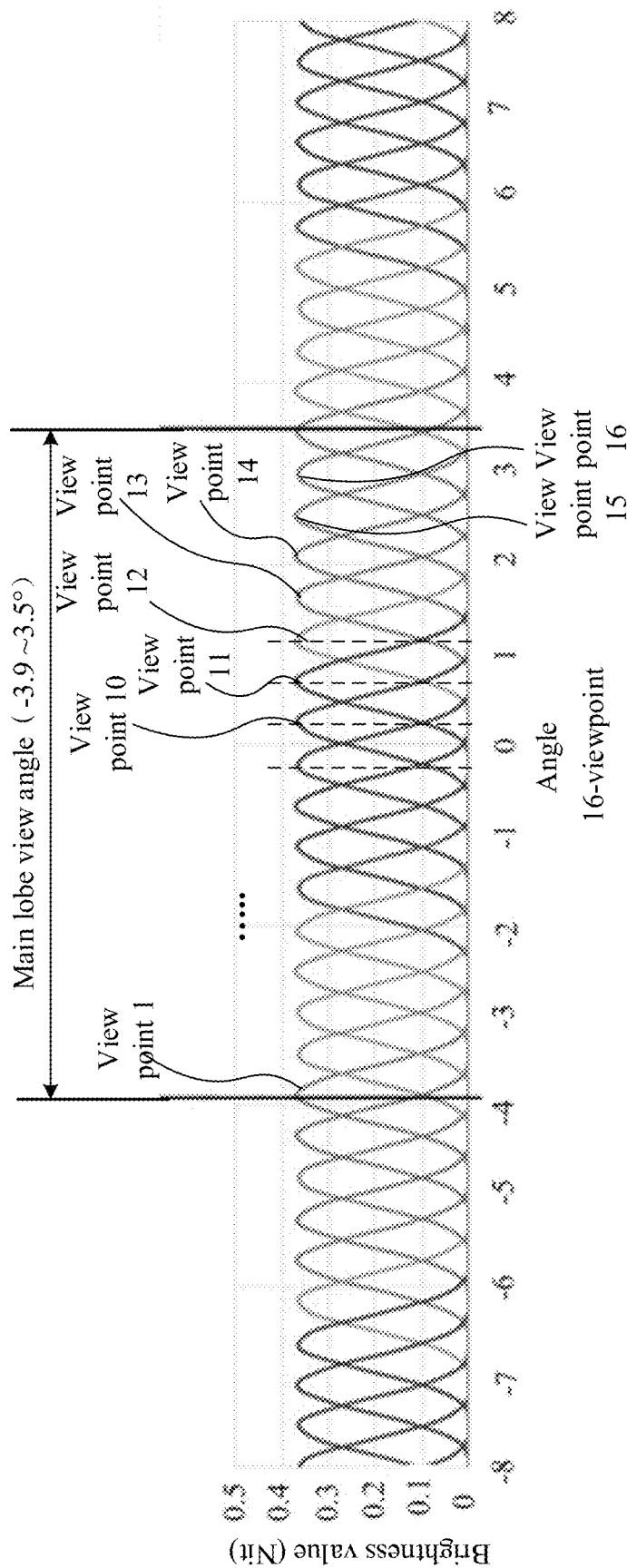
FIG. 8 is a superimposed diagram of a brightness distribution curve corresponding to an image of each viewpoint of a 16-viewpoint image display module.
Figure 9:
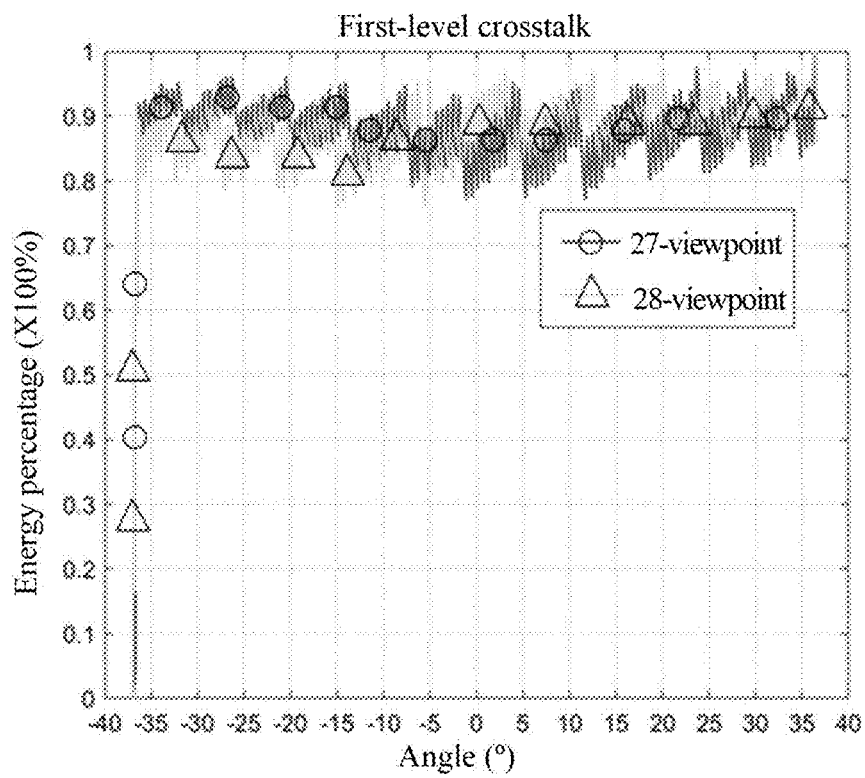
FIG. 9 is a schematic diagram of first-level crosstalk simulation results of 28-viewpoint and 27-viewpoint image display modules.
Figure 10:
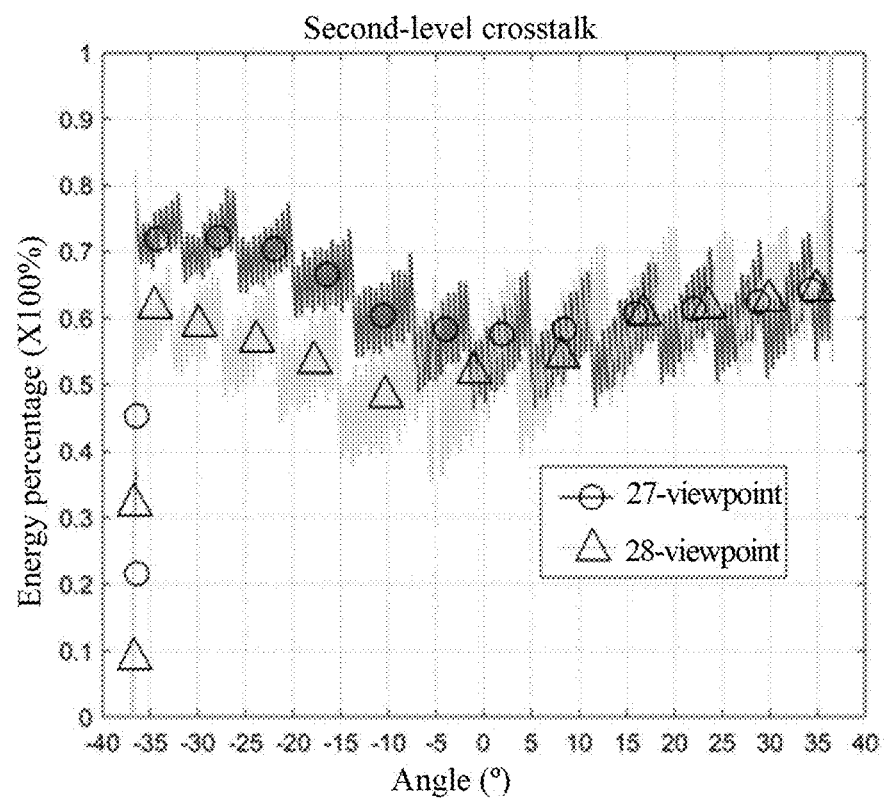
FIG. 10 is a schematic diagram of second-level crosstalk simulation results of 28-viewpoint and 27-viewpoint image display modules.

FIG. 6 is a superposition diagram of the brightness distribution curve corresponding to the image of each viewpoint of the 28-viewpoint image display module, FIG. 7 is a superposition diagram of the brightness distribution curve corresponding to the image of each viewpoint of the 27-viewpoint image display module, and FIG. 8 is a superposition diagram of the brightness distribution curve corresponding to the image of each viewpoint of the 16-viewpoint image display module. Each brightness peak corresponds to an optimal view angle of the light-emitting side of the display panel, i.e. each brightness peak is a brightness value obtained at the optimal view angle (also known as the viewing area) of the light-emitting side. The different optimal view angles of the present disclosure are in one-to-one correspondence with different viewing areas on the light-emitting side of the display panel.

In an exemplary embodiment, selecting one viewpoint as the reference viewpoint includes: in the white light brightness curves of all viewpoints, the viewpoint with the optimal view angle (i.e. the test angle corresponding to the brightness peak) equal to 0°, or greater than 0° and closest to 0° within a main lobe view angle is selected as the reference viewpoint, and in the embodiment of the present disclosure, the test angle is defined as an included angle between a connecting line from a test point to a center point of the screen and an vertical line led from the center point of the display panel. For example, as shown in FIG. 5, a test point A is located on a vertical line from the center point of the display panel, i.e. a test angle of the test point A is 0°, and a test angle $\theta$ of a test point B is an included angle between line segments OB and OA, i.e. 10°.

Each viewpoint includes a main lobe view angle and a side lobe view angle. An angle of light emitted by a light emitting element after it irradiates on its corresponding microlens is the main lobe view angle, and an angle of light emitted by the light emitting element after it irradiates on a microlens adjacent to its corresponding microlens is the side lobe view angle. Herein, 3D effect in an area of the main lobe view angle is the best. There may be a dark area between the main lobe view angle and the side lobe view angle.

A cause of the side lobe view angle is mainly that since the light emitted by the light emitting element is approximately 180°, while an aperture of the microlens corresponding to the light emitting element is limited, and the light-emitting element is relatively away from the microlens, the light emitted by the light emitting element will irradiate on the microlens adjacent to its corresponding microlens, thus forming the side lobe view angle.

In an exemplary embodiment, calculating a crosstalk value between another viewpoint except the reference viewpoint and the reference viewpoint includes: determining brightness values corresponding to the reference viewpoint and the another viewpoint at the peak of the reference viewpoint, within the main lobe view angles of the white light brightness curves of all the viewpoints, and determining a distance between the peak of the another viewpoint and the peak of the reference viewpoint; and calculating the crosstalk value between the another viewpoint and the reference viewpoint according to the determined brightness values corresponding to the reference viewpoint and the another viewpoint at the peak of the reference viewpoint and the distance between the peak of the another viewpoint and the peak of the reference viewpoint.

In an exemplary embodiment, the crosstalk value between the another viewpoint and the reference viewpoint is directly proportional to the brightness value corresponding to the another viewpoint at the peak of the reference viewpoint, is inversely proportional to the brightness value corresponding to the reference viewpoint at the peak of the reference viewpoint, and is inversely proportional to the distance between the peak of the another viewpoint and the peak of the reference viewpoint.

In an exemplary embodiment, within the main lobe view angle, the brightness value corresponding to the reference viewpoint at the peak of the reference viewpoint is Li, the brightness value corresponding to a viewpoint j at the peak of the reference viewpoint is Lj, wherein both i and j are between 1 and N, and i≠j, N is the quantity of viewpoints of the display panel, and the distance between a peak of the viewpoint j and the peak of the reference viewpoint is Dij; a crosstalk value between the viewpoint j and the reference viewpoint is Lj/(Li*Dij).

The embodiment of the present disclosure provides a method for calculating the crosstalk value between the viewpoint j and the reference viewpoint, which is only an example, and the embodiment of the present disclosure does not limit how the crosstalk value between the viewpoint J and the reference viewpoint is calculated.

Taking 28-viewpoint as an example, as shown in FIG. 6, a test angle corresponding to the peak of a viewpoint 16 is greater than 0° and closest to 0°, therefore, the viewpoint 16 is selected as the reference viewpoint, and the crosstalk of the viewpoint on the right side of the viewpoint 16 to the viewpoint 16 is first calculated. Since main lobe view angles of the viewpoints 17, 18, 19, 20, 21, and 22 and a main lobe view angle of the viewpoint 16 have overlapping areas therebetween, the viewpoints 17, 18, 19, 20, 21, and 22 all have crosstalk to the viewpoint 16.

Within the main lobe view angle, the brightness value at the peak of the viewpoint 16 is recorded as L16, and the brightness values of the viewpoints 17, 18, 19, 20, 21, and 22 at the peak of the viewpoint 16 are recorded as L17, L18, L19, L20, L21, and L22 respectively. At a position of the optimal viewing distance, distances between the peaks of the viewpoints 17, 18, 19, 20, 21, and 22 and the peak of the viewpoint 16 are D1, D2, D3, D4, D5, D6, then it is obtained that: a first-level crosstalk is L17/(L16*D1), a second-level crosstalk is L18/(L16*D2), a third-level crosstalk is L19/(L16*D3), a fourth-level crosstalk is L20/(L16*D4), a fifth-level crosstalk is L21/(L16*D5), and a sixth-level crosstalk is L22/(L16*D6). Among them, the first-level crosstalk is a crosstalk of a viewpoint directly adjacent to the reference viewpoint to the reference viewpoint, the second-level crosstalk is a crosstalk of a viewpoint separated by one viewpoint from the reference viewpoint to the reference viewpoint, the third-level crosstalk is a crosstalk of a viewpoint separated by two viewpoints from the reference viewpoint to the reference viewpoint, the fourth-level crosstalk is a crosstalk of a viewpoint separated by three viewpoints from the reference viewpoint to the reference viewpoint, the fifth-level crosstalk is a crosstalk of a viewpoint separated by four viewpoints from the reference viewpoint to the reference viewpoint, and the sixth-level crosstalk is a crosstalk of a viewpoint separated by five viewpoints from the reference viewpoint to the reference viewpoint.

Likewise, the per-level crosstalks of viewpoints on the left side of the viewpoint 16 to the viewpoint 16 are calculated.

Likewise, for the image display module designed with 27-viewpoint, calculation may also be performed according to this method to obtain the per-level crosstalks of viewpoints on the left and right sides of the reference viewpoint to the reference viewpoint.

In the step 30, viewpoint density for the auto-stereoscopic display is evaluated according to the comparison of the size of the image spot radius of each viewpoint and the image point spacing between the viewpoint and the adjacent viewpoint and the calculated crosstalk values between another viewpoint and the reference viewpoint.

As shown in FIGS. 6 to 8, within the main lobe view angle, spacing between adjacent viewpoints is very small, wherein spacing between adjacent viewpoints of 28-viewpoint is 0.3°, spacing between adjacent viewpoints of 27-viewpoint is 0.304°, and spacing between adjacent viewpoints of 16-viewpoint is 0.4625°. The smaller the spacing between viewpoints, the smoother the viewing and the closer to the situation of countless viewpoints in the real world, however, the adjacent image spots must be clear and distinguishable, and a condition for forming a clear image is: r≤d (image spot radius≤image point spacing); the formula is given as follows:

(pupil diameter/(the quantity of viewpoints*2*distance from human eye to grating array)+1.22*wavelength/length of each grating unit in the grating array)*image distance≤length of each grating unit in grating array*distance from human eye to image point/distance from human eye to grating array.

It can be seen from the formula that designs of the 28-viewpoint and the 27-viewpoint with minimum viewpoint spacing of 0.3° and 0.304° meet the condition for forming the clear image, and are the preferred designs.

The per-level crosstalk values of the 28-viewpoint and the 27-viewpoint are calculated respectively. After comparison, the crosstalk values of the six levels of the 28-viewpoint are all smaller than those of the 27-viewpoint. Therefore, the effect of the 28-viewpoint is better than that of the 27-viewpoint.

Figure 11:
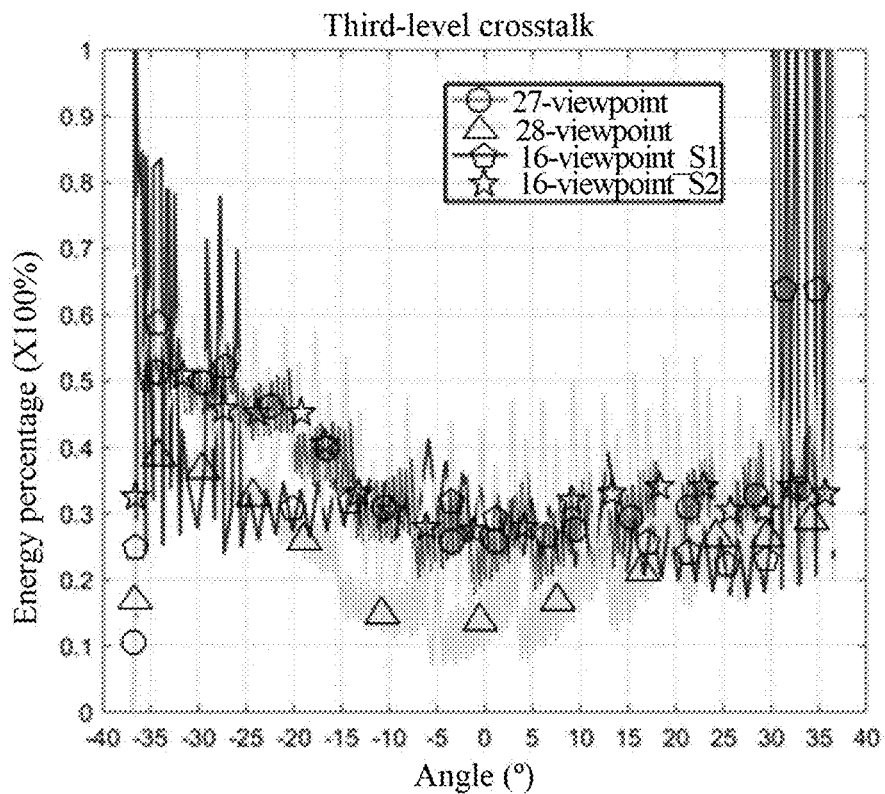
FIG. 11 is a schematic diagram of third-level crosstalk simulation results of 28-viewpoint and 27-viewpoint image display modules.
Figure 12:
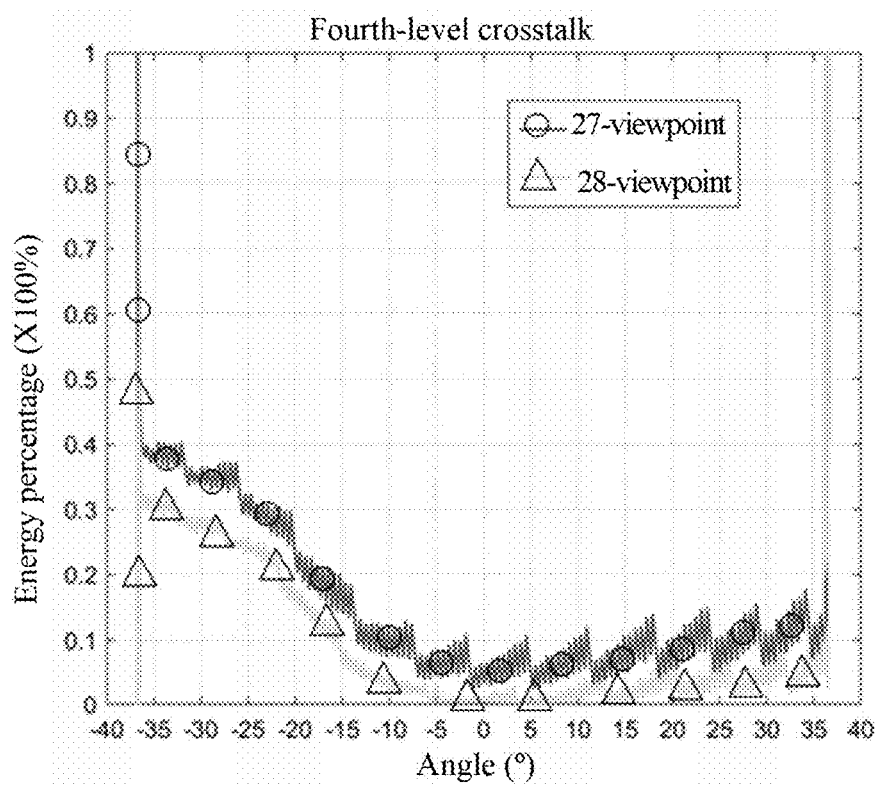
FIG. 12 is a schematic diagram of fourth-level crosstalk simulation results of 28-viewpoint and 27-viewpoint image display modules.
Figure 13:
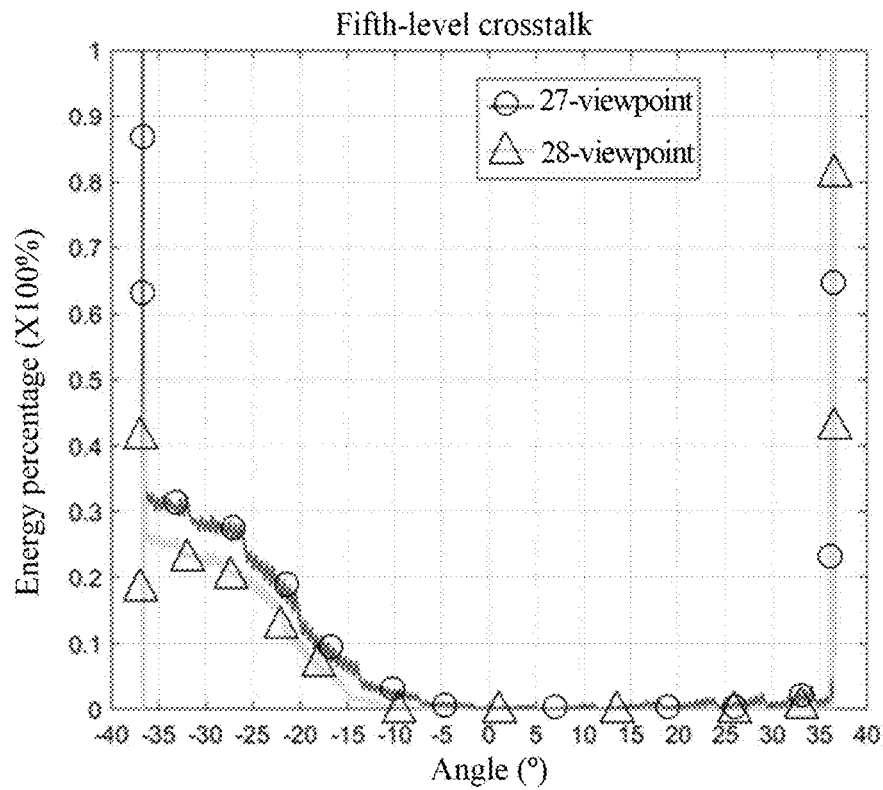
FIG. 13 is a schematic diagram of fifth-level crosstalk simulation results of 28-viewpoint and 27-viewpoint image display modules.
Figure 14:
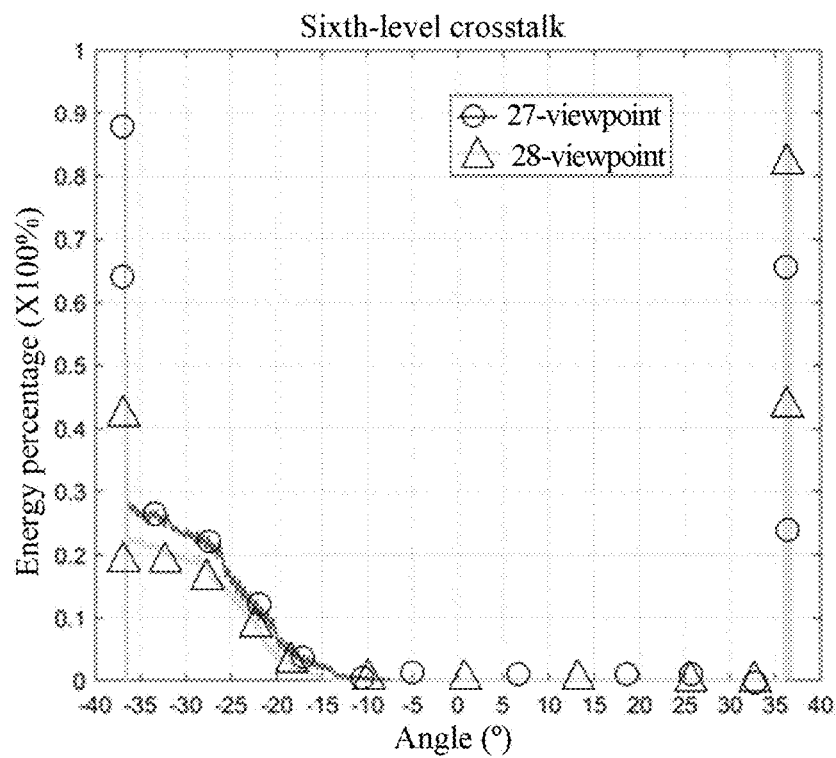
FIG. 14 is a schematic diagram of sixth-level crosstalk simulation results of 28-viewpoint and 27-viewpoint image display modules.

A simulation is performed by optical software (light tools), as shown in FIGS. 9 to 14, simulation results of the six level crosstalks of the 28-viewpoint and the 27-viewpoint are consistent with calculation results of the method for evaluating the viewpoint density according to the embodiment of the present disclosure, wherein 16-viewpoint_S1 and 16-viewpoint_S2 in FIG. 11 represent two different 16-viewpoint designs.

In an exemplary embodiment, the method further includes:

a crosstalk weight value of another viewpoints except the reference viewpoint is acquired; and a total crosstalk value is calculated according to the crosstalk value between the another viewpoint and the reference viewpoint and the crosstalk weight value.

For example, still taking the crosstalk of the viewpoint on the right side of the viewpoint 16 to the viewpoint 16 in the above 28-viewpoint as an example, assuming that a crosstalk weight value of the first-level crosstalk is a1, a crosstalk weight value of the second-level crosstalk is a2, a crosstalk weight value of the third-level crosstalk is a3, a crosstalk weight value of the fourth-level crosstalk is a4, a crosstalk weight value of the fifth-level crosstalk is a5, and a crosstalk weight value of the sixth-level crosstalk is a6, where a6≥a5≥a4≥a3≥a2≥a1, and a1+a2+a3+a4+a5+a6=1, then:

total crosstalk value on the right side=first-level crosstalk*a1+second-level crosstalk*a2+third-level crosstalk*a3+fourth-level crosstalk*a4+fifth-level crosstalk*a5+sixth-level crosstalk*a6;

likewise, a total crosstalk value on the left side is obtained;

preferably, the total crosstalk value is calculated and obtained: total crosstalk value=b1* total crosstalk value on the right side+b2*total crosstalk value on the left side. Herein, b1 is the crosstalk weight value of the total crosstalk value on the right side, b2 is the crosstalk weight value of the total crosstalk value on the left side, and b1+b2=1. For example, b1=0.5, and b2=0.5.

In an exemplary embodiment, evaluating the viewpoint density for the auto-stereoscopic display according to the comparison of the size of the image spot radius of each viewpoint and the image point spacing between the viewpoint and the adjacent viewpoint and the calculated crosstalk value between another viewpoint and the reference viewpoint, including: when the image spot radius of each viewpoint is less than or equal to the image point spacing between the viewpoint and the adjacent viewpoint, and the calculated total crosstalk value is less than a preset total crosstalk threshold, the viewpoint density for the auto-stereoscopic display is evaluated as being excellent; and when the image spot radii of one or more viewpoints in the image spot radii of each of the viewpoints are larger than the image point spacing between the viewpoint and the adjacent viewpoint, or the calculated total crosstalk value is larger than the preset total crosstalk threshold, the viewpoint density for the auto-stereoscopic display is evaluated as being poor.

In an exemplary embodiment, evaluating viewpoint density for the auto-stereoscopic display according to the comparison of the size of the image spot radius of each viewpoint and the image point spacing between the viewpoint and the adjacent viewpoint and the calculated crosstalk value between another viewpoint and the reference viewpoint, includes: when the image spot radius of each viewpoint is less than or equal to the image point spacing between the viewpoint and the adjacent viewpoint, and the calculated crosstalk value between each of the other viewpoints and the reference viewpoint is less than a preset crosstalk threshold, the viewpoint density for the auto-stereoscopic display is evaluated as being excellent; and when the image spot radii of one or more viewpoints in the image spot radii of each of the viewpoints are larger than the image point spacing between the viewpoint and the adjacent viewpoint, or one or more of the calculated crosstalk values between other viewpoints and the reference viewpoint are greater than the preset crosstalk threshold, the viewpoint density for the auto-stereoscopic display is evaluated as being poor.

In an exemplary embodiment, the preset crosstalk threshold may be set in a one-to-one corresponding relationship with per-level crosstalk described above.

An embodiment of the present disclosure further provides a processing device, which may include a processor and a memory storing a computer program that is runnable on the processor, wherein when the processor executes the computer program, steps of the method for evaluating the viewpoint density according to any one of the preceding items in the present disclosure are implemented.

Figure 15:
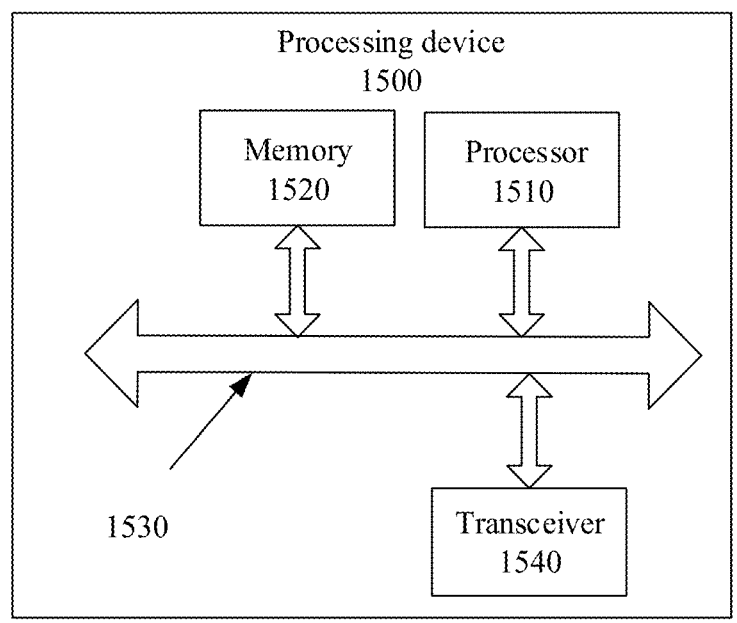
FIG. 15 is a schematic structural diagram of a processing device according to an embodiment of the present disclosure.

As shown in FIG. 15, in an example, a processing device 1500 may include: a processor 1510, a memory 1520, a bus system 1530, and a transceiver 1540, wherein the processor 1510, the memory 1520, and the transceiver 1540 are connected via the bus system 1530, the memory 1520 is configured to store instructions, and the processor 1510 is configured to execute the instructions stored in the memory 1520 to control the transceiver 1540 to send signals. For example, the transceiver 1540 may acquire brightness values of light corresponding to the different test angles collected from an optical test device (such as a brightness meter) under control of the processor 1510, and after comparing the size of the image spot radius of each viewpoint and the image point spacing between the viewpoint and the adjacent viewpoint, and calculate the crosstalk value between another viewpoint and the reference viewpoint, sending a notification to another device through the transceiver.

It should be understood that the processor 1510 may be a Central Processing Unit (CPU), or the processor 1510 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor or the processor may be any conventional processor, etc.

The memory 1520 may include a read-only memory and a random access memory, and provides instructions and data to the processor 1510. A portion of the memory 1520 may also include a non-volatile random access memory. For example, the memory 1520 may also store information of a device type.

The bus system 1530 may include a power bus, a control bus, a status signal bus, or the like in addition to a data bus. However, for clarity of illustration, various buses are all denoted as the bus system 1530 in FIG. 15.

In an implementation process, processing performed by the processing device may be completed by an integrated logic circuit of hardware in the processor 1510 or instructions in a form of software. That is, the steps of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 1520. The processor 1510 reads information in the memory 1520, and completes the steps of the above method in combination with its hardware. In order to avoid repetition, detailed description is not provided herein.

An embodiment of the present disclosure further provides a system for evaluating the viewpoint density, including a display module, an optical test device and a processing device. The processing device may be the processing device 1500 as described above. The display module includes a display panel and a grating array disposed on the light-emitting side of the display panel, configured to sequentially display the image of each viewpoint; and the optical test device is configured to measure the brightness value of light on the light-emitting side of the display panel.

An embodiment of the present disclosure further provides a computer readable storage medium, the computer-readable storage medium stores executable instructions, wherein when the executable instructions are executed by the processor, the method for evaluating the viewpoint density provided by any of the above embodiments of the present disclosure may be implemented. The method for evaluating the viewpoint density may be used for selecting the appropriate quantity of viewpoints when designing the auto-stereoscopic display device, or for evaluating the advantages and the disadvantages of the quantity of viewpoints of the current auto-stereoscopic display device, so as to realize the optimal design of the quantity of viewpoints of the auto-stereoscopic display device, and improve the auto-stereoscopic display effects. The method for driving the system for evaluating the viewpoint density by executing the executable instructions to perform evaluation of the viewpoint density is basically the same as the method for evaluating the viewpoint density provided by the above embodiment of the present disclosure, which will not be repeated here.

In the description of the embodiments of the present disclosure, it should be understood that an orientation or a positional relation indicated by the terms "middle", "upper", "lower", "front", "rear", "vertical", "horizontal", "top", "bottom", "inner", "outer" and the like is based on the orientation or the positional relation shown in the accompanying drawings, which is only for the convenience of describing the present disclosure and simplifying the description, rather than indicating or implying that the device or the element referred to must have the specific orientation, or be constructed and operated in the specific orientation, and thus cannot be interpreted as a limitation on the present disclosure.

In the description of the embodiments of the present disclosure, unless otherwise explicitly specified and defined, the terms "install", "connect", "couple" should be understood in a broad sense, for example, a connection may be a fixed connection or a detachable connection, or an integrated connection; it may be a mechanical connection or an electrical connection; it may be a direct connection, or may be an indirect connection through an intermediary, or may be an internal connection between two elements. Those of ordinary skill in the art can understand the specific meanings of the above mentioned terms in the present disclosure according to specific situations.

It can be understood by those of ordinary skill in the art that all or some certain steps in the method disclosed above and function modules/units in the system and the apparatus may be implemented as software, firmware, hardware, and proper combinations thereof In a hardware implementation mode, division of the function modules/units mentioned in the above description is not always division corresponding to physical components. For example, a physical component may have multiple functions, or several physical components may cooperate to execute a function or an step. Some certain components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

Although the embodiments disclosed in the present disclosure are as above, the described contents are only embodiments used for convenience of understanding the present disclosure and are not intended to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

The invention claimed is:

1. A method for evaluating a viewpoint density, comprising:
    acquiring a quantity of viewpoints of a display panel;
    comparing a size of an image spot radius of each viewpoint and image point spacing between the viewpoint and an adjacent viewpoint, and selecting one viewpoint as a reference viewpoint, calculating a crosstalk value between another viewpoint except the reference viewpoint and the reference viewpoint; and
    evaluating a viewpoint density for auto-stereoscopic display according to comparison of the size of the image spot radius of each viewpoint and the image point spacing between the viewpoint and the adjacent viewpoint and the calculated crosstalk value between the another viewpoint and the reference viewpoint.

2. The method of claim 1, wherein a light-emitting side of the display panel comprises a plurality of grating arrays arranged along a set direction;
    the image spot radius of each viewpoint is calculated according to a following formula:
    image spot radius=(pupil diameter/(quantity of viewpoints*2*distance from human eye to grating array)+1.22*wavelength/length of each grating unit in the grating array)*image distance; and
    the image point spacing between the viewpoint and the adjacent viewpoint is calculated according to a following formula:
    the length of each grating unit in the grating array*distance from the human eye to image point/the distance from the human eye to the grating array.

3. The method of claim 1, wherein before selecting the one viewpoint as the reference viewpoint, the method further comprises:
    controlling the display panel to display an image of each viewpoint sequentially, wherein when the image of each viewpoint is displayed, all sub-pixels used for displaying the image of a current viewpoint display white images, all sub-pixels used for displaying images of other viewpoints display black images, and sequentially acquiring a brightness value of light at each corresponding test angle when displaying the image of the current viewpoint on a light-emitting side of the display panel, obtaining a white light brightness curve of all the viewpoints.

4. The method of claim 3, wherein selecting the one viewpoint as the reference viewpoint comprises:
    in the white light brightness curve of all the viewpoints, selecting a viewpoint with an optimal view angle equal to 0°, or greater than 0° and closest to 0° within a main lobe view angle as the reference viewpoint.

5. The method of claim 3, wherein calculating the crosstalk value between the another viewpoint except the reference viewpoint and the reference viewpoint comprises:
    determining brightness values corresponding to the reference viewpoint and the another viewpoint at a peak of the reference viewpoint within a main lobe view angle of the white light brightness curve of all the viewpoints, and determining a distance between a peak of the another viewpoint and a peak of the reference viewpoint; and calculating the crosstalk value between the another viewpoint and the reference viewpoint according to the determined brightness values corresponding to the reference viewpoint and the another viewpoint at the peak of the reference viewpoint and the distance between the peak of the another viewpoint and the peak of the reference viewpoint.

6. The method of claim 5, wherein the crosstalk value between the another viewpoint and the reference viewpoint is directly proportional to the brightness value corresponding to the another viewpoint at the peak of the reference viewpoint, is inversely proportional to the brightness value corresponding to the reference viewpoint at the peak of the reference viewpoint, and is inversely proportional to the distance between the peak of the another viewpoint and the peak of the reference viewpoint.

7. The method of claim 6, wherein within the main lobe view angle of the white light brightness curve of all the viewpoints, the brightness value corresponding to the reference viewpoint at the peak of the reference viewpoint is Li, a brightness value corresponding to a viewpoint j at the peak of the reference viewpoint is Lj, both i and j are between 1 and N, and i ≠ j, N is the quantity of viewpoints of the display panel, and a distance between a peak of the viewpoint j and the peak of the reference viewpoint is Dij; and a crosstalk value between the viewpoint j and the reference viewpoint is: Lj/(Li*Dij).

8. The method of claim 5, wherein the another viewpoint comprises a viewpoint located on the left side of the reference viewpoint and a viewpoint located on the right side of the reference viewpoint.

9. The method of claim 1, further comprising:
acquiring a crosstalk weight value of the another viewpoint except the reference viewpoint; and
calculating a total crosstalk value according to the crosstalk value between the another viewpoint and the reference viewpoint and the crosstalk weight value.

10. The method of claim 9, wherein evaluating the viewpoint density for the auto-stereoscopic display according to the comparison of the size of the image spot radius of each viewpoint and the image point spacing between the viewpoint and the adjacent viewpoint and the calculated crosstalk value between the another viewpoint and the reference viewpoint comprises:
when the image spot radius of each viewpoint is less than or equal to the image point spacing between the viewpoint and the adjacent viewpoint, and the calculated total crosstalk value is less than a preset total crosstalk threshold, evaluating the viewpoint density for the auto-stereoscopic display as being excellent; and
when the image spot radii of one or more viewpoints in the image spot radii of each of the viewpoints are larger than the image point spacing between the viewpoint and the adjacent viewpoint, or the calculated total crosstalk value is larger than the preset total crosstalk threshold, evaluating the viewpoint density for the auto-stereoscopic display as being poor.

11. The method of claim 1, wherein evaluating the viewpoint density for the auto-stereoscopic display according to the comparison of the size of the image spot radius of each viewpoint and the image point spacing between the viewpoint and the adjacent viewpoint and the calculated crosstalk value between the another viewpoint and the reference viewpoint comprises:
when the image spot radius of each viewpoint is less than or equal to the image point spacing between the viewpoint and the adjacent viewpoint, and the calculated crosstalk value between each of the other viewpoints and the reference viewpoint is less than a preset crosstalk threshold, evaluating the viewpoint density for the auto-stereoscopic display as being excellent; and
when the image spot radii of one or more viewpoints in the image spot radii of each of the viewpoints are larger than the image point spacing between the viewpoint and the adjacent viewpoint, or one or more of the calculated crosstalk values between other viewpoints and the reference viewpoint are larger than a preset crosstalk threshold, evaluating the auto-stereoscopic display viewpoint density as being poor.

12. A processing device, comprising: a processor and a memory storing a computer program that is runnable on the processor, wherein when the processor executes the computer program, steps of the method for evaluating the viewpoint density according to claim 1 are implemented.

13. A system for evaluating a viewpoint density, comprising: a display module, an optical test device, and the processing device of claim 12, wherein:
the display module comprises a display panel and a grating array arranged on a light-emitting side of the display panel;
the optical test device is configured to measure a light brightness value on the light-emitting side of the display panel.

14. A computer storage medium, storing computer executable instructions, wherein the computer executable instructions are used for performing steps of the method for evaluating the viewpoint density according to claim 1.

* * * * *